United States Patent
Yu

(10) Patent No.: US 11,758,204 B2
(45) Date of Patent: Sep. 12, 2023

(54) ELECTRONIC DEVICE AND CONTROL METHOD THEREFOR

(71) Applicant: SAMSUNG ELECTRONICS CO., LTD., Suwon-si (KR)

(72) Inventor: Yeonguk Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/286,324

(22) PCT Filed: Nov. 26, 2019

(86) PCT No.: PCT/KR2019/016391
§ 371 (c)(1),
(2) Date: Apr. 16, 2021

(87) PCT Pub. No.: WO2020/111744
PCT Pub. Date: Jun. 4, 2020

(65) Prior Publication Data
US 2021/0344974 A1 Nov. 4, 2021

(30) Foreign Application Priority Data
Nov. 28, 2018 (KR) .......................... 10-2018-0149691

(51) Int. Cl.
*H04N 21/233* (2011.01)
(52) U.S. Cl.
CPC ................................ *H04N 21/233* (2013.01)

(58) Field of Classification Search
CPC ......... H04N 21/233; H04N 21/440236; H04N 21/42203; H04N 21/4394; H04N 21/4884; H04N 21/4307; H04N 21/43074
See application file for complete search history.

(56) References Cited

U.S. PATENT DOCUMENTS

| 9,621,122 B2 | 4/2017 | Kim et al. |
| 2009/0119725 A1 * | 5/2009 | Park .................... H04L 67/1095 725/106 |

(Continued)

FOREIGN PATENT DOCUMENTS

| JP | 3731664 B2 | 1/2006 |
| JP | 2008-252322 A | 10/2008 |

(Continued)

OTHER PUBLICATIONS

Communication dated Jul. 26, 2021, issued by the European Patent Office in European Application No. 19888854.7.

(Continued)

*Primary Examiner* — Adil Ocak
(74) *Attorney, Agent, or Firm* — Sughrue Mion, PLLC

(57) ABSTRACT

An electronic device is disclosed. The present electronic device comprises a display, a speaker, an input unit, and a processor for controlling the display so that an image signal inputted through the input unit is displayed, controlling the speaker so that an audio signal synchronized with the displayed image signal is outputted, and controlling the display so that caption information corresponding to the audio signal outputted during a preset previous time is displayed on the basis of the point of time when a user command is inputted.

13 Claims, 16 Drawing Sheets

(56) References Cited

U.S. PATENT DOCUMENTS

| | | | |
|---|---|---|---|
| 2010/0100923 A1* | 4/2010 | Toiyama | H04N 21/4382 725/131 |
| 2014/0111688 A1* | 4/2014 | Suvorov | H04N 21/43072 348/500 |
| 2014/0142951 A1* | 5/2014 | Crawley | H04L 12/1822 704/275 |
| 2015/0170325 A1* | 6/2015 | Abecassis | H04N 21/4542 345/2.1 |
| 2015/0277552 A1 | 10/2015 | Wilairat et al. | |
| 2016/0124704 A1 | 5/2016 | Kim | |
| 2018/0160069 A1* | 6/2018 | Burger | H04N 21/42204 |
| 2018/0213289 A1 | 7/2018 | Lee et al. | |
| 2018/0220195 A1 | 8/2018 | Panchaksharaiah et al. | |
| 2018/0277142 A1* | 9/2018 | Veeramani | G10L 25/57 |

FOREIGN PATENT DOCUMENTS

| | | |
|---|---|---|
| JP | 2009-27578 A | 2/2009 |
| JP | 2009-177720 A | 8/2009 |
| JP | 2009-218741 A | 9/2009 |
| JP | 2011-109406 A | 6/2011 |
| JP | 6322125 B2 | 5/2018 |
| JP | 2018-148381 A | 9/2018 |
| KR | 10-2007-0042000 A | 4/2007 |
| KR | 10-2008-0086793 A | 9/2008 |
| KR | 10-2011-0080712 A | 7/2011 |
| KR | 10-2014-0096774 A | 8/2014 |
| KR | 10-2015-0057591 A | 5/2015 |
| KR | 10-2016-0050713 A | 5/2016 |
| KR | 10-1663098 B1 | 10/2016 |
| KR | 10-2018-0066476 A | 6/2018 |
| KR | 10-1856192 B1 | 6/2018 |
| KR | 10-2018-0087009 A | 8/2018 |
| KR | 10-2018-0087969 A | 8/2018 |

OTHER PUBLICATIONS

International Search Report dated Mar. 4, 2020 issued by the International Searching Authority in International Application No. PCT/KR2019/016391 (PCT/ISA/210).
International Written Opinion dated Mar. 4, 2020 issued by the International Searching Authority in International Application No. PCT/KR2019/016391 (PCT/ISA/237).
Communication dated Mar. 31, 2022 issued by the European Patent Office in European Application No. 19 888 854.7.
Communication dated Nov. 25, 2021 issued by the European Patent Office in European Application No. 19 888 854.7.
Communication dated Dec. 13, 2022 issued by the European Patent Office in European Patent Application No. 19888854.7.
Communication dated Jan. 17, 2023 issued by the European Patent Office in European Patent Application No. 19888854.7.
Anonymous, "Voice user interface", Wikipedia, Nov. 6, 2018, XP093007106, https://en.wikipedia.org/w/index.php?title=Voice_user_interface&oldid=867535686, 2 pages total.
Communication dated Mar. 10, 2023 by the Korean Intellectual Property Office in Korean Patent Application No. 10-2018-0149691.

* cited by examiner video          audio

Example 1

Thank you boys, thank you

Example 2

Thank you boys, thank you

Example 3

Thank you boys, thank you

ELECTRONIC DEVICE AND CONTROL METHOD THEREFOR

TECHNICAL FIELD

This disclosure relates to an electronic device and a control method therefor. More particularly, this disclosure relates to an electronic device providing caption information according to a user input and a control method therefor.

BACKGROUND ART

If a user could not hear a sound at a specific point of time due to a surrounding environment or carelessness of the user during watching a video, the user may have a curiosity with respect to the sound that the user has not heard.

As for a content of which reproduction point of time is controllable such as a video on demand (VOD), a user may move to the corresponding point of time and may reproduce the contents again. However, if the user is watching the content which may not be reproduced again, there may be a problem that the user may not hear again the sound the user could not heard.

If the user may control the reproduction point of time such as a VOD content, there may be a problem that a flow of a currently reproduced content may be interrupted, in order to obtain information about the sound that the user has not heard.

In general, even when a caption is always displayed, a user may pass a specific caption without reading the caption. In this case, since the user needs to move the reproduction point of time to watch the specific caption again, there may be a problem in that the flow of currently reproduced content may be interrupted.

For example, the user may watch a particular movie. The user may be curious about lines of a character the user heard just before, without watching the movie being disturbed. In order to know the lines of the character that the user heard just before, the user has to rewind the movie again. However, if the movie (content) being watched by the user is a content that is received in real time, the user may not watch or hear the previous content.

Even when receiving content which may be rewound such as a VOD service, the user may wish to know previous lines without flow of content being disturbed. It is assumed that a first user and a second user are simultaneously watching the content in one electronic device, and only the first user is curious about the previous lines. In this case, when the first user rewinds the currently watched content in order to know the previous lines, there may be a problem of disturbing the watching flow of the second user.

DISCLOSURE

Technical Problem

It is an object of the disclosure to provide an electronic device to display caption information using an audio signal of content without the current flow of watching being disturbed and a control method therefor.

Technical Solution

An electronic device according to an embodiment may include a display, a speaker, an inputter, and a processor configured to control the display to display an image signal inputted through the inputter, control the speaker to output an audio signal synchronized with the displayed image signal, and based on a user command being input, control the display to display caption information corresponding to the audio signal outputted during a preset previous time based on a point of time of inputting the user command.

The processor may identify a voice signal from an audio signal outputted during the preset previous time, obtain a text corresponding to the voice signal, and control the display to display the caption information based on the obtained text.

The processor may identify a voice signal corresponding to the additional information from the audio signal based on the additional information included in the user command.

The processor may, while the image signal inputted through the inputter is displayed, control the display to display caption information corresponding to the audio signal outputted during the preset previous time.

The processor may control the display to display the image signal displayed during the preset previous time on a partial region of the display along with the caption information.

The processor may, based on the partial region of the display being selected according to a user command, adjust an output volume of an audio signal corresponding to the image signal inputted through the inputter.

The processor may, based on a partial region of the display being selected according to a user command, control not to output the audio signal corresponding to the image signal inputted through the inputter and control to output the audio signal corresponding to the image signal displayed on the partial region of the display.

The electronic device may further include a memory and the processor may store the audio signal inputted through the inputter in the memory, and delete, from the memory, the audio signal inputted prior to the preset time with respect to a current point of time, among the stored audio signals.

The electronic device may further include a microphone and a memory and the processor may, while the audio signal is outputted through the speaker, control the microphone to perform recording, store a signal recorded through the microphone in the memory, obtain a signal recorded during the preset previous time based on a point of time of inputting the user command, among the recorded signals stored in the memory, and display the caption information based on the obtained signal.

The processor may, based on receiving a user voice command, identify whether the user voice command is the user command to display the caption information.

A method of controlling the electronic device according to an embodiment may include displaying an image signal inputted through an inputter; outputting an audio signal synchronized with the displayed image signal, and based on a user command being input, displaying caption information corresponding to the audio signal outputted during a preset previous time based on a point of time of inputting the user command.

The displaying the caption information may include identifying a voice signal from an audio signal outputted during the preset previous time, obtaining a text corresponding to the voice signal, and displaying the caption information based on the obtained text.

The method of controlling the electronic device may include identifying a voice signal corresponding to the additional information from the audio signal based on the additional information included in the user command.

The displaying the caption information may include, while the image signal inputted through the inputter is displayed, displaying caption information corresponding to the audio signal outputted during the preset previous time.

The displaying the caption information may include displaying the image signal displayed during the preset previous time on a partial region of the display along with the caption information.

The outputting an audio signal may include, based on the partial region of the display being selected according to a user command, adjusting an output volume of an audio signal corresponding to the image signal inputted through the inputter.

The method may include, based on a partial region of the display being selected according to a user command, controlling not to output the audio signal corresponding to the image signal inputted through the inputter and controlling to output the audio signal corresponding to the image signal displayed on the partial region of the display.

The method may further include a memory storing the audio signal inputted through the inputter in the memory, and deleting, from the memory, the audio signal inputted prior to the preset time with respect to a current point of time, among the stored audio signals.

The displaying may include, while the audio signal is outputted through the speaker, controlling the microphone to perform recording, storing a signal recorded through the microphone in the memory, obtaining a signal recorded during the preset previous time based on a point of time of inputting the user command, among the recorded signals stored in the memory, and displaying the caption information based on the obtained signal.

A non-transitory computer readable medium storing computer instructions executed by the processor of the electronic device may cause the electronic device to perform operations including displaying an image signal inputted through the inputter, the outputting an audio signal synchronized with the displayed image signal, and the displaying caption information corresponding to the audio signal outputted during a preset previous time based on a point of time of inputting the user command.

BEST MODE FOR CARRYING OUT THE INVENTION

Figure 1:
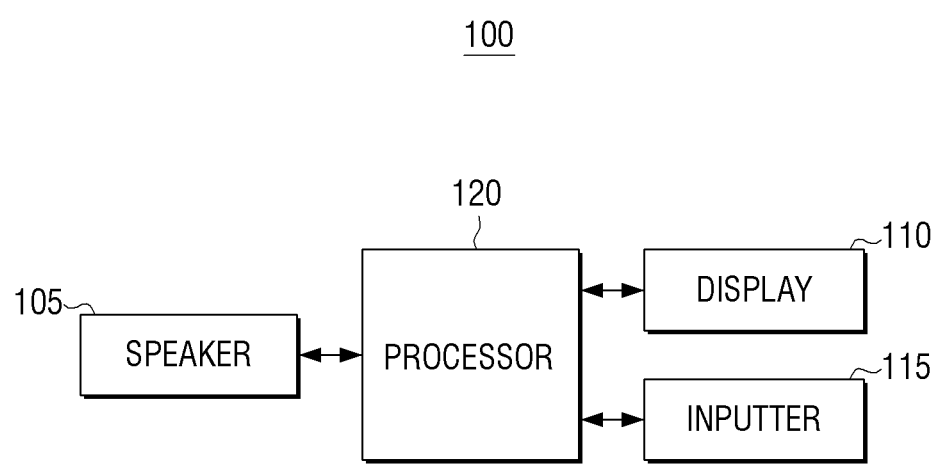
FIG. 1 is a block diagram illustrating an electronic device according to an embodiment.

Before describing the disclosure in detail, an overview for understanding the disclosure and drawings will be provided.

The terms used in the present specification and the claims are general terms identified in consideration of the functions of the various embodiments of the disclosure. However, these terms may vary depending on intent, technical interpretation, emergence of new technologies, and the like of those skilled in the related art. Some terms may be selected by an applicant arbitrarily, and the meaning thereof will be described in the detailed description. Unless there is a specific definition of a term, the term may be construed based on the overall contents and technological understanding of those skilled in the related art.

Further, like reference numerals indicate like components that perform substantially the same functions throughout the disclosure. For convenience of descriptions and understanding, the same reference numerals or symbols are used and described in different example embodiments. In other words, although elements having the same reference numerals are all illustrated in a plurality of drawings, the plurality of drawings do not refer to one embodiment.

In addition, the ordinal numbers "first," "second," and the like may be used to distinguish between components in the specification and claims. This ordinal number is used to distinguish the same or similar components from one another and the meaning of the terms should not be limited by the use of the ordinal number. The terms are used only for the purpose of distinguishing one element from another. For example, the elements associated with the ordinal numbers should not be limited in order or order of use by the numbers. If necessary, the ordinal numbers may be replaced with each other.

A singular expression includes a plural expression, unless otherwise specified. It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

Further, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing embodiments, detailed description of related known technologies may unnecessarily confuse the gist of the disclosure, the detailed description will be omitted.

The term such as "module," "unit," "part," and so on may refer, for example, to an element that performs at least one function or operation, and such element may be implemented as hardware or software, or a combination of hardware and software. Further, except for when each of a plurality of "modules," "units," "parts," and the like must be realized in an individual hardware, the components may be integrated in at least one module or chip and be realized in at least one processor.

When any part is connected to another part, this includes a direct connection and an indirect connection through another medium. Further, when a certain part includes a certain element, unless specified to the contrary, another element may be additionally included, rather than precluding another element.

FIG. 1 is a block diagram illustrating an electronic device according to an embodiment.

Referring to FIG. 1, the electronic device 100 may include a speaker 105, a display 110, an inputter 115, and a processor 120.

The electronic device 100 may include various devices including a display. The electronic device 100 may be a TV, a desktop PC, a notebook, a smartphone, a tablet PC, a server, or the like. In the meantime, the aforementioned example is merely to describe an electronic device and the embodiment is not limited to the device above.

The speaker 105 may be an element to output not only various audio data processed by the input/output interface 150 but also various notification sounds or a voice message. The electronic device 100 may output an audio signal included in the content through the speaker 105.

The display 110 may be implemented as a display of various types such as a liquid crystal display (LCD), organic light emitting diodes (OLED) display, plasma display panel (PDP), or the like. In the display 110, a backlight unit, a driving circuit which may be implemented as an a-si TFT, low temperature poly silicon (LTPS) TFT, organic TFT (OTFT), or the like, may be included as well. In the meantime, the display 110 may be implemented as a touch screen coupled with a touch sensor, a flexible display, a third-dimensional (3D) display, or the like.

According to an embodiment, the display 110 may include a display panel for outputting an image and a bezel housing a display panel. According to an embodiment, the bezel may include a touch sensor (not shown) for sensing user interaction.

The electronic device 100 may display content through the display 110.

The inputter 115 may be an element to perform an operation of receiving content. For example, the inputter 115 may perform an operation to receive content from an external device by using an input interface, a communication module, a tuner, or the like. The content received through the inputter 115 may be displayed by the electronic device 100 through the display 110.

The processor 120 may perform overall control operations of the electronic device 100. The processor 120 may perform a function to control overall operations of the electronic device.

The processor 120 may be implemented with at least one of a digital signal processor (DSP), a microprocessor, and a time controller (TCON). The processor 120 is not limited thereto and may include at least one of, a central processing unit (CPU), a micro controller unit (MCU), a micro processing unit (MPU), a controller, an application processor (AP), a communication processor (CP), and an advanced reduced instruction set computing (RISC) machine (ARM) processor or may be defined as a corresponding term. The processor 120 may be implemented in a system on chip (SoC) type or a large scale integration (LSI) type in which a processing algorithm is built therein or in a field programmable gate array (FPGA) type.

The processor 120 may control the display 110 to display an image signal input through the inputter 115, control the speaker 105 to output an audio signal synchronized with the displayed image signal, and control the display 110 to display caption information corresponding to the audio signal output during a preset previous time (or predetermined previous time or predetermined time or threshold previous time or threshold time) based on the time when the user command is input.

The image signal may be received by an external server, an external device, or the like, and the image signal may be a signal including information about the image. The image signal may correspond to the content received by the external device. The disclosure describes an image signal and a content interchangeably.

The image signal (content) may include both a video signal and an audio signal, and the video signal and the audio signal may be synchronized based on the time information. The processor 120 may control the components of the electronic device 100 to output a synchronized video signal and an audio signal. A component for outputting each signal may be the speaker 105 and the display 110. The video signal and the audio signal may be synchronized by time information, where the time information may be information commonly included in the video signal and the audio signal. The operation of synchronization in consideration of the time information is described below.

For example, it may be assumed that A scene is included at 1 second, a B scene at 2 second, and a C scene at 3 second in the video signal, and A sound is included at 1 second, a B sound at 2 second, and a C sound at 3 second in the audio signal. The processor 120 may control the display 110 to sequentially display the A scene, the B scene, and the C scene in the display 110 in consideration of the time information. The processor 120 may control the speaker 105 to sequentially output the A sound, the B sound, and the C sound to the speaker 105. The processor 120 may control the sound A to be output to the speaker 105 when the A scene is displayed on the display 110 based on the time information, control the speaker 105 to output B sound when the B scene is displayed on the display 110, and control the speaker 105 to output the C sound when the C scene is displayed on the display 110. The description of distinguishing the video signal and the audio signal according to the time information will be described later with reference to FIG. 7.

The user command may be a control command requesting caption information. Here, the user command may be a voice command, and the user command may be a control signal corresponding to a button of the electronic device 100 or a button of a remote control device of the electronic device 100.

The processor 120 may store the audio signal in the memory 160 from the signal of the video watched by the user. In general, the processor 120 may temporarily store the received image signal in the memory 160 to display an image signal, and then control the display 110 to display an image signal. Meanwhile, the processor 120 may store the received image signal for a predetermined period of time (or a threshold period of time) in the memory 160 in order to provide caption information to the user in addition to the general operation described above. The predetermined time may be adjusted by the user.

In order to store an audio signal corresponding to a predetermined time, the processor 120 may store an audio signal in a volatile memory or a non-volatile memory. If the audio signal is stored in a volatile memory, the processor 120 may quickly analyze the stored audio signal. When storing in a non-volatile memory, the processor 120 may store a large amount of audio signals and store audio signals for a long time.

The memory 160 may include a non-volatile memory and a volatile memory. When the audio signal storage time set by the user is less than or equal to a threshold value, the processor 120 may store the audio signal in the non-volatile memory, and when the audio signal storage time set by the user is greater than or equal to the threshold value, the processor 120 may control the memory 160 to store the audio signal in the volatile memory. The threshold value described above may be a value determined in consideration of the capacity of the volatile memory and may be changed by the user.

When a user command requesting caption information is received by the processor 120, the processor 120 may analyze the audio signal stored in the memory 160 and provide caption information. The processor 120 may identify a voice signal from an audio signal output during a preset previous time, obtain a text corresponding to the voice signal, and control the display 110 to display caption information based on the obtained text.

The processor 120 may identify a voice signal in an audio signal stored in the memory 160. It may be assumed that the processor 120 has stored an audio signal in memory 160 for ten seconds. When the processor 120 receives a user command requesting caption information, the processor 120 may separate only the voice signal from the audio signal of ten seconds stored in the memory 160. The processor 120 may perform a voice recognition operation based on the separated voice signal. The processor 120 may obtain text information corresponding to a voice signal through a voice recognition operation. Although the audio signal stored in the memory 160 is ten seconds, performing the voice recognition operation for caption information may be an audio signal corresponding to five seconds. This may be changed by the user's setting. In addition, information included in a user command may be used. For example, if the processor 120 receives a command to "please show caption information for recent 5 second", the processor 120 may provide the caption information corresponding to the latest 5 second among the audio signal stored as much as 10 second.

The audio signal may include not only voice but also background music, other noise, or the like, and the processor 120 may perform voice recognition operation by separating only the voice necessary to provide caption information.

The processor 120 may generate caption information using text information corresponding to the finally obtained voice signal. The processor 120 may display caption information generated by using a pre-set user interface (UI) in the display 110. A specific description of displaying the caption information will be described later with reference to FIGS. 7 to 9.

The processor 120 may identify a voice signal corresponding to the additional information in the audio signal based on the additional information included in the user command. The additional information may refer to age information, information for predicting age, gender information, and information for predicting gender. According to another embodiment, the additional information may refer to various information for specifying a speaker (character) appearing in the image (content) received through the inputter 115.

For example, voice of a plurality of speakers may be included in the audio signal stored in the memory 160. For example, it is assumed that the audio signal stored in the memory 160 includes voices of male students in their 10s and voices of male teachers in their 80s. The processor 120 may specify a speaker corresponding to the additional information, and may separate only the specified speaker's voice. In accordance with the embodiment disclosed in FIG. 10, it is assumed that additional information of "male student in 10s" is included in the user command. The processor 120 may determine that the user desires dialogue of teenage male students based on the additional information. The processor 120 may specify teenage male students among male students in 10s and male teachers in their 80s included in the audio signal based on the additional information. The processor 120 may separate the voice of teenage male students from the audio signal stored in the memory 160, and perform a voice recognition operation on the basis of the separated voice. The processor 120 may provide the lines of the male students in 10s as caption information. When the processor 120 provides caption information using additional information, user convenience may be increased by providing only desired caption information. The detailed description corresponding to the additional information will be described later with reference to FIGS. 10 to 11.

The processor 120 may control the display 110 to display caption information corresponding to the audio signal output during a preset previous time while the image signal input through the inputter 115 is displayed. The processor 120 may provide caption information without stopping the content (image signal) watched by the user. The processor 120 may provide caption information separately from the video signal output through the display 110 and the audio signal output through the speaker 105. Since the processor 120 outputs the existing content (image signal) except for the caption information, the user may not be interfered with the existing watching flow. A detailed description of displaying caption information while the existing content (image signal) is displayed will be described later with reference to FIG. 7. The processor 120 may store the video signal along with the audio signal in the memory 160. In addition, the processor 120 may store the video signal together with the audio signal in the memory 160. As described above, the processor 120 may store a video signal corresponding to a predetermined size or time in the memory 160. The operation of storing the audio signal and the video signal may not refer that the audio signal and video signal are temporarily stored in order to display the received image signal on the display 110. The operation of operating the audio signal and the video signal in the memory 160 may be an operation performed separately to provide the user with video information corresponding to caption information or caption information to the user.

The processor 120 may control the display 110 to display the displayed image signal (video signal or video information) along with the caption information for a preset previous time in some regions of the display 110. When the user sees only the caption information (text), it may be confused that the corresponding caption information corresponds to which part. Accordingly, the processor 120 may display video information corresponding to the caption information (the image signal displayed during a previous time) together with the caption information on the display 110. The video information corresponding to the caption information may refer to an image displayed on the display 110 when a voice corresponding to the caption is output. The processor 120 may output image signals (audio signals and video signals) received through the inputter 115 and simultaneously display the caption information and video information corresponding to caption information on the display 110. For user convenience, the processor 120 may control the display 110 to display video information corresponding to caption information and script information to be smaller than an existing image signal.

When a partial region of the display 110 is selected according to the user command, the processor 120 may adjust the output volume of the audio signal corresponding to the video signal input through the inputter 115. Here, the partial region of the display 110 selected by the user may refer to a UI including caption information. If the processor 120 identifies that the user clicks the UI region corresponding to the caption information, the processor 120 may reduce the volume of the previously output audio signal. If the processor 120 reduces the volume of the output audio signal, the user may focus on the caption information. The detailed description will be described later with reference to FIG. 12.

The processor 120, based on a partial region of the display 110 being selected according to a user command, may control not to output an audio signal corresponding to the image signal input through the inputter 115, and may control to output an audio signal corresponding to an image signal displayed on the partial region of the display 110. If there is a preset event, the processor 120 may stop output of the audio signal received through the inputter 115 and may output the audio signal (audio information) corresponding to the caption information. The processor 120 according to an embodiment as described above may provide only caption information. The audio signal corresponding to the caption information may refer to the voice signal used for the voice recognition operation to obtain the caption information (text information). The processor 120 may not stop the image displayed on the display 110 and may keep displaying the video signal received through the inputter 115. If the audio signal corresponding to the currently received video signal is stopped, and the previous audio signal (audio information) is output, the user may hear the desired dialogue again and thus the user convenience may be improved. In the operation described above, current audio signal is blocked. Therefore, the aforementioned operation may be used when the user determines that the point of time of current reproduction is not important. A detail will be described with reference to FIG. 13.

The electronic device 100 may further include a memory and the processor 120 may store the audio signal input through the inputter 115 in the memory and may delete, from the memory, the audio input prior to a predetermined time with respect to the current point of time, among the stored audio signals. The processor 120 may predetermine the size of the data of the audio signal stored in the memory 160. For example, the processor 120 may determine the data size of the audio signal stored in the memory 160 at 200 MB, and the processor 120 may store the audio signal up to 200 MB, and if the audio signal exceeds 200 MB, may delete the audio signal that was initially stored and may store a new audio signal. It is assumed that the audio signal is divided in 1 MB unit. It is assumed that from audio 1 to audio 200 are stored in the memory 160. The processor 120, based on receiving audio 201, may delete audio 1 and store audio 201.

The processor 120 may predetermine the time size of the audio signal stored in the memory 160. For example, the processor 120 may set the time size of the audio signal stored in the memory 160 to ten seconds. It is assumed that the audio signal is divided into 1 second unit. For ten seconds, the processor 120 may store audio signals from audio 1 to audio 10 in the memory 160. When audio 11 is received, the processor 120 may delete audio 1 and may store audio 11 in the memory 160. The above 200 MB or 10 seconds is only a particular number for purposes of illustration, and may be changed by the user. The detailed description will be described later with reference to FIG. 14.

The electronic device 100 may further include a microphone and a memory, and the processor 120 may control the microphone to perform recording while the audio signal is output through the speaker 105, store the recorded signal in the memory through the microphone, obtain a signal recorded for a preset previous time with respect to the time when the user command is input, among the recorded signals stored in the memory, and control the display 110 to display the caption information based on the obtained signal.

Based on receiving a user voice command, the processor 120 may identify whether the user command is to display the caption information. The processor 120, by receiving a user voice, may identify whether the voice corresponds to a prestored command. If the processor 120 identifies that the received user voice command is a user command to display the caption information, the processor 120 may generate and provide caption information. The electronic device 100 according to an embodiment may display caption information and a video signal currently reproduced along with a preset UI. The user may visually identify a previous dialogue history without cutting a reproduction flow of the content which is currently reproduced. In some cases, the user may identify the information corresponding to the caption information as sound. In that the current reproduction flow of the content is not interrupted, the user convenience may be raised. The electronic device 100 includes an operation to store an audio signal in a memory, and thus, if the reproduction timing of the content is not moved, and when caption information is not provided, the electronic device 100 may provide a user with information about the previous voice dialogue history included in the content.

Figure 2:
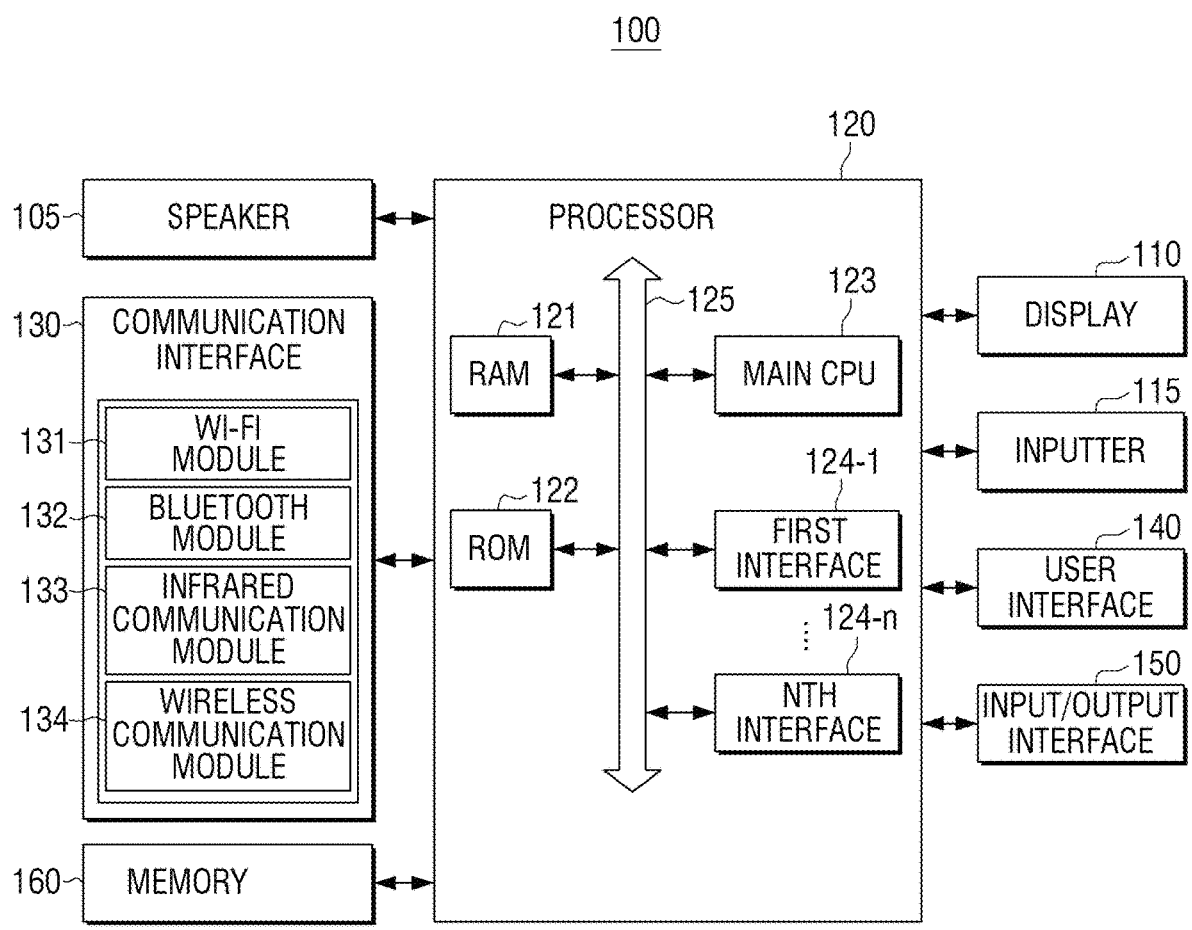
FIG. 2 is a block diagram illustrating a specific configuration of the electronic device illustrated in FIG. 1.

FIG. 2 is a block diagram illustrating a specific configuration of the electronic device illustrated in FIG. 1.

Referring to FIG. 2, the electronic device 100 according to an embodiment may include a speaker 105, a display 110, an inputter 115, a processor 120, a communication interface 130, a user interface 140, an input/output interface 150, and a memory 160.

The operations of the camera 105, the display 110, and the processor 120 which are overlapped with the operations described above will not be described.

The processor 120 controls overall operations of the electronic device 100 using various programs stored in the memory 110.

To be specific, the processor 120 includes at least one of a random access memory (RAM) 121, a read-only memory (ROM) 122, a main central processing unit (CPU) 123, a first to $n^{th}$ interfaces 124-1~124-n, and a bus 125.

The RAM 121, the ROM 122, the main CPU 123, the first to $n^{th}$ interfaces 124-1 to 124-n, or the like, may be interconnected through the bus 125.

The ROM 122 stores one or more instructions for booting the system and the like. When the turn-on instruction is input and power is supplied, the CPU 123 copies the OS stored in the memory 110 to the RAM 121 according to the stored one or more instructions in the ROM 122, and executes the OS to boot the system. When the booting is completed, the CPU 123 copies various application programs stored in the memory 110 to the RAM 121, executes the application program copied to the RAM 121, and performs various operations.

The main CPU 123 accesses the memory 110 and performs booting using an operating system (OS) stored in the memory 110, and performs various operations using various programs, contents data, or the like, stored in the memory 110.

The first to $n^{th}$ interface 124-1 to 124-$n$ are connected to the various elements described above. One of the interfaces may be a network interface connected to an external device through the network.

The processor 120 may perform a graphic processing function (e.g., video processing function). For example, the processor 120 may generate a screen including various objects such as icons, images, text, and the like, using a calculator (not shown) and a renderer (not shown). Here, a calculator may calculate an attribute value such as a coordinate value, a shape, a size, and a color to be displayed by each object according to the layout of the screen based on the received control command. A renderer may generate display screens of various layouts including objects based on the attribute value calculated by the calculator. The processor 120 may perform various image processing such as at least one of decoding, scaling, noise filtering, frame rate conversion, resolution conversion, or the like, for the video data.

The processor 120 may perform processing of audio data. Specifically, the processor 120 may perform various audio processing such as at least one of decoding, amplifying, noise filtering, and the like, on the audio data.

A communication interface 130 may communicate with other external devices using various types of communication methods. The communication interface 130 may include a Wi-Fi module 131, a Bluetooth module 132, an infrared communication module 133, a wireless communication module 134, or the like. The processor 120 may communicate with various external devices using the communication interface 130. The external device may include a display device such as a TV, an image processing device such as a set-top box, an external server, a control device such as a remote control, an audio output device such as a Bluetooth speaker, a lighting device, a smart cleaner, a home appliance such as a smart refrigerator, a server such as an Internet of things (TOT) home manager, or the like.

The Wi-Fi module 131 and the Bluetooth module 132 perform communication using a Wi-Fi method and a Bluetooth method, respectively. When using the Wi-Fi module 131 or the Bluetooth module 132, various connection information such as a service set identifier (SSID) and a session key may be transmitted and received first, and communication information may be transmitted after communication connection.

The infrared ray communication module 133 performs communication according to infrared data association (IrDA) technology that transmits data wireless to a local area using infrared ray between visible rays and millimeter waves.

The wireless communication module 134 refers to a module performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the communication methods as described above.

The communication interface 130 may include at least one of a local area network (LAN) module, Ethernet module, or wired communication module performing communication using a pair cable, a coaxial cable, an optical cable, or the like.

According to an embodiment, the communication interface 130 may use the same communication module (for example, Wi-Fi module) for communicating with an external device such as a remote controller and an external server.

According to another example, the communication interface 130 may use a different communication module (for example, a Wi-Fi module) to communicate with an external server and an external device such as a remote controller. For example, the communication interface 120 may use at least one of an Ethernet module or a Wi-Fi module to communicate with the external server, and may use a Bluetooth (BT) module to communicate with an external device such as a remote controller. However, this is only an example and the communication interface 130 may use at least one communication module among various communication modules when communicating with a plurality of external devices or external server in other implementations.

The communication interface 130 may further include at least one of a tuner and a demodulator.

The tuner (not shown) may receive a radio frequency (RF) broadcast signal by tuning a channel selected by a user or all the prestored channels, among the RF broadcast signal received through an antenna.

The demodulator (not shown) may receive and demodulate a digital intermediate frequency (DIF) signal converted by the tuner and perform channel decoding, or the like.

The user interface 140 may be implemented using a device such as at least one of a button, a touch pad, a mouse, a keyboard, or a touch screen capable of performing the above-described display function and operation input function. Here, the button may be various types of buttons such as at least one of a mechanical button, a touch pad, a wheel, or the like, formed in an arbitrary region such as at least one of a front portion, a side portion, a back portion, or the like, of the outer surface of the main body of the electronic device 100.

The input and output interface 150 may be at least one of a high-definition multimedia interface (HDMI), mobile high-definition link (MHL), universal serial bus (USB), display port (DP), Thunderbolt, video graphics array (VGA) port, RGB port, d-subminiature (D-SUB), digital visual interface (DVI), and the like.

The HDMI is an interface capable of transmitting high performance data for an AV device which inputs and outputs audio and video signals. The DP is the interface which may implement an image of a full HD of 1920×1080 but also an ultra-high resolution screen such as 2560×1600 or 3840×2160, and a 3D stereoscopic image, and transmit a digital sound. The Thunderbolt is an input/output interface for high-speed data transmission and connection, and may connect a PC, a display, a storage device, and the like, with one port in parallel.

The input and output interface 150 may input or output at least one of an audio signal and a video signal.

In some embodiments, the input and output interface 150 may include a port for inputting or outputting only an audio signal or a video signal separately, or may be implemented as one port that inputs or outputs all the audio signals or video signals.

The electronic device 100 may be implemented as a device not including a display and transmit an image signal to a separate display device.

For voice recognition of a voice signal received from the external device, the electronic device 100 may transmit the corresponding voice signal to an external server.

In this case, a communication module for communicating with the external device and the external server may be implemented as one. For example, a communication module for communicating with the external device and the external server may be the same as the Wi-Fi module.

A communication module for communicating with the external device and the external server may be implemented separately. For example, communication with the external device may be performed through a Bluetooth module, and communication with the external server may be performed through the Ethernet modem or the Wi-Fi module.

The memory 160 may be implemented as an internal memory such as a read-only memory (ROM) (for example, electrically erasable programmable read-only memory (EEPROM)) and a random-access memory (RAM) or a memory separate from the processor 120.

A memory embedded in the electronic device 100 may be implemented as at least one of a volatile memory such as a dynamic random access memory (DRAM), a static random access memory (SRAM), a synchronous dynamic random access memory (SDRAM), or a non-volatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive (HDD) or a solid state drive (SSD). In the case of a memory detachably mounted to the electronic device 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a universal serial bus (USB) memory) connectable to the USB port, or the like.

The electronic device 100 may further include a microphone (not shown). The microphone is an element to receive a user voice or other sound and convert to audio data. The microphone may convert the received analog user voice signal to the digital voice signal and transmit the signal to the electronic device 100.

The microphone (not shown) may receive the user voice in an active state. For example, the microphone may be integrally formed as an integral unit on at least one of an upper side, a front side direction, a side direction, or the like of the electronic device 100. The microphone may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

The electronic device 100 according to an embodiment may transmit a received digital audio signal to a voice recognition server. In this case, the voice recognition server may convert the digital audio signal into text information using a speech to text (STT). In this case, the voice recognition server may transmit text information to another server or an electronic apparatus to perform a search corresponding to the text information, and in some cases, perform a direct search.

The electronic device 100 according to another embodiment may convert the user voice signal to text information by directly applying the STT function to the digital sound signal, and transmit the converted text information to the external server.

Figure 3:
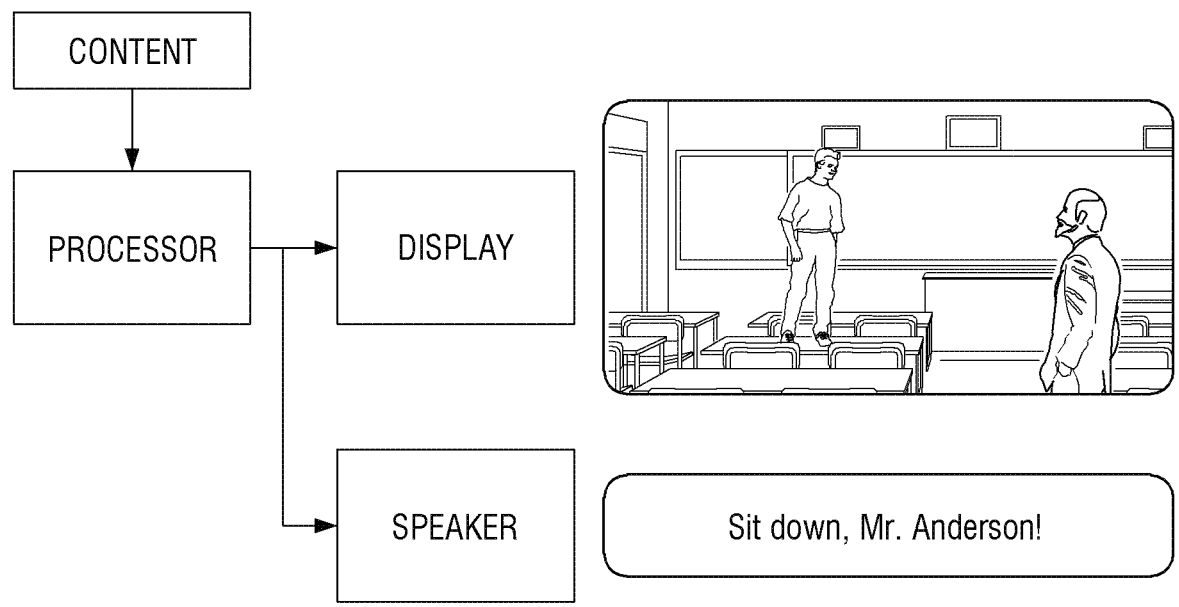
FIG. 3 is a diagram illustrating an example of outputting a video signal and an audio signal respectively from content.

FIG. 3 is a diagram illustrating an example of outputting a video signal and an audio signal respectively from content.

Referring to FIG. 3, the electronic device 100 may receive content from an external device through a communication module. The processor 120 may divide a video signal and an audio signal using the received content. The processor 120 may transmit a video signal to the display 110 and display the same, and may transmit the audio signal to the speaker 105 and output the same.

Referring to FIG. 3, the electronic device 100 may output a video signal (male teacher in their 80s yelling at a student standing on a desk) on the display 110 and output audio signal ("Sit down, Mr. Anderson!") through the speaker 105.

Figure 4:
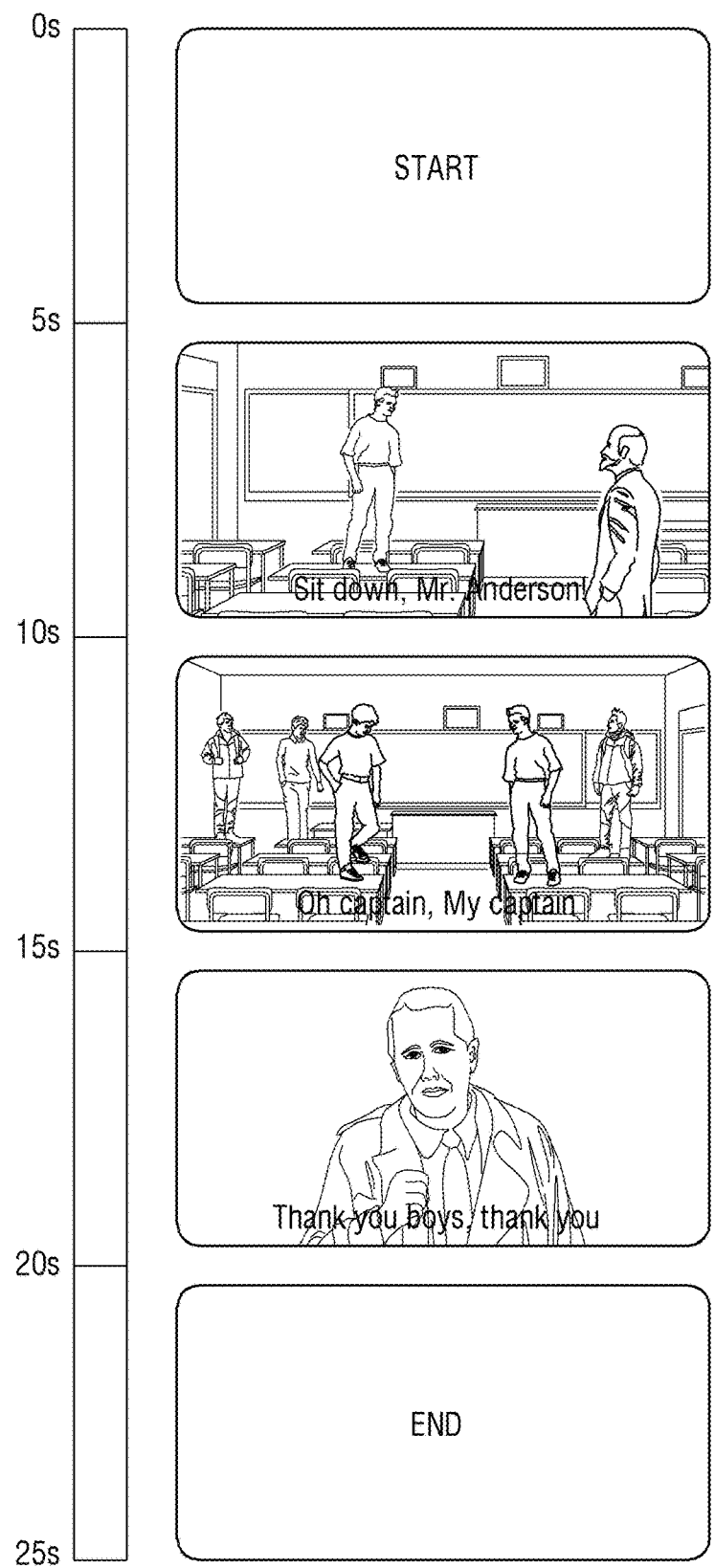
FIG. 4 is a diagram illustrating content in which a caption is displayed.

FIG. 4 is a diagram illustrating content in which a caption is displayed.

Referring to FIG. 4, the electronic device 100 may display content including different scenes over time. It will be described that the electronic device 100 displays content with a script. The content may include a scene displayed with "start" from 0 second to 5 second. The content may include a scene where the male teacher in 80s is yelling at a student standing on a desk between 5 second and 10 second, a scene where a plurality of students standing on a desk between 10 seconds and 15 seconds, a scene where a male in 40s is speaking between 15 second and 20 second, and a scene where "END" is displayed between 20 second and 25 second.

The electronic device 100 may provide caption information along with the video signal. In a content where the caption information is provided all the time, the user may not watch a specific script due to an external environment or negligence of the user. For example, while watching a movie, a door bell may ring and the user may turn head. In this example, the user may have to change the reproduction point of time to reproduce the missing part and the watching flow may be interrupted.

Figure 5:
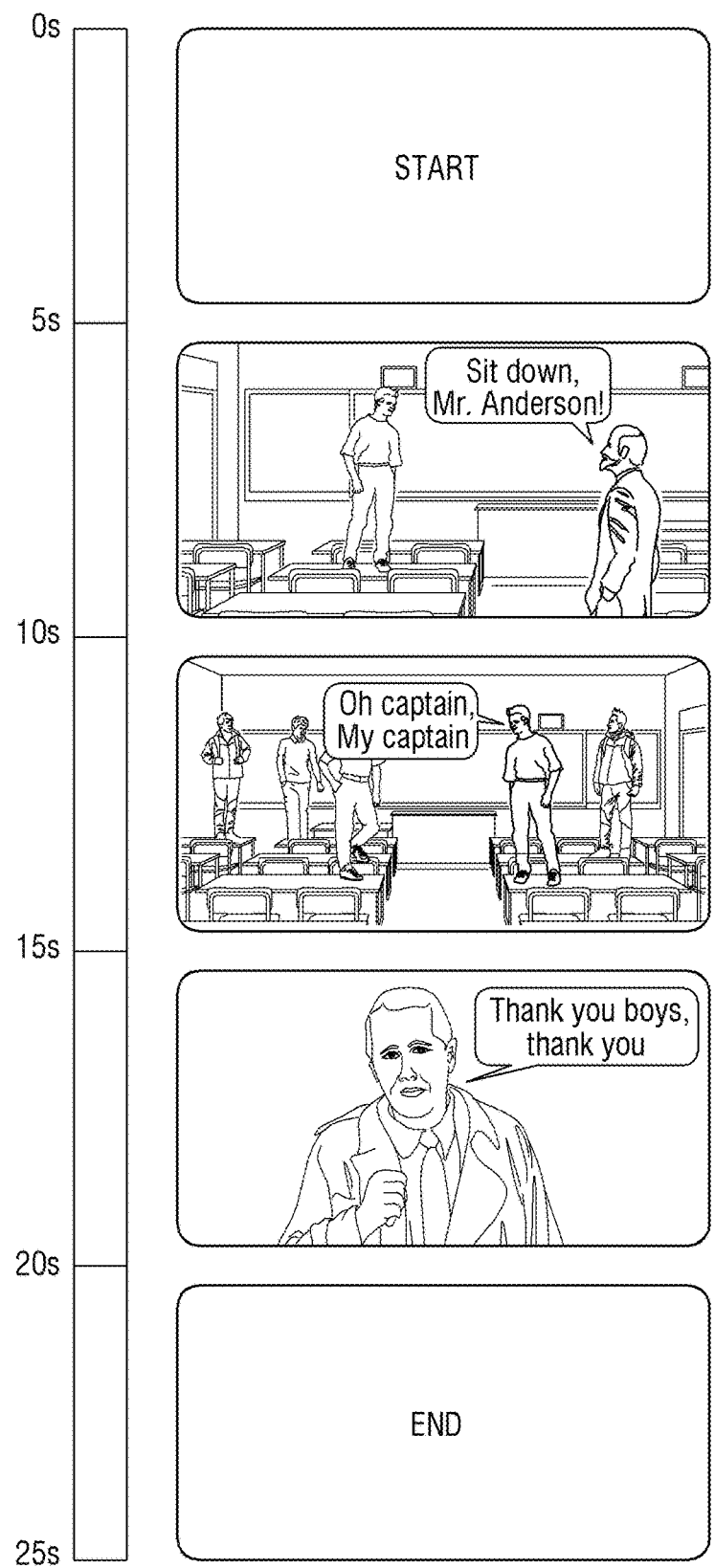
FIG. 5 is a diagram illustrating content including a dialogue of characters.

FIG. 5 is a diagram illustrating content including a dialogue of characters.

Referring to FIG. 5, the electronic device 100 may display content in which a video signal and an audio signal are combined. The electronic device 100 may display content without script, and the content without script may include an audio signal. In general, the video signal and the audio signal are mutually synchronized according to the flow of time, and the electronic device 100 may output the video signal and the audio signal using the display 110 and the speaker 105.

Referring to FIG. 5, although the dialogue caption is used, the dialogue content displayed on the dialogue caption may actually correspond to the audio signal. The electronic device 100 may provide only a video signal in which the caption is not actually displayed. As shown in FIG. 5, the user may not hear a specific conversation, and when the reproduction time is changed, there may be a problem that watching flow may be interrupted.

Figure 6:
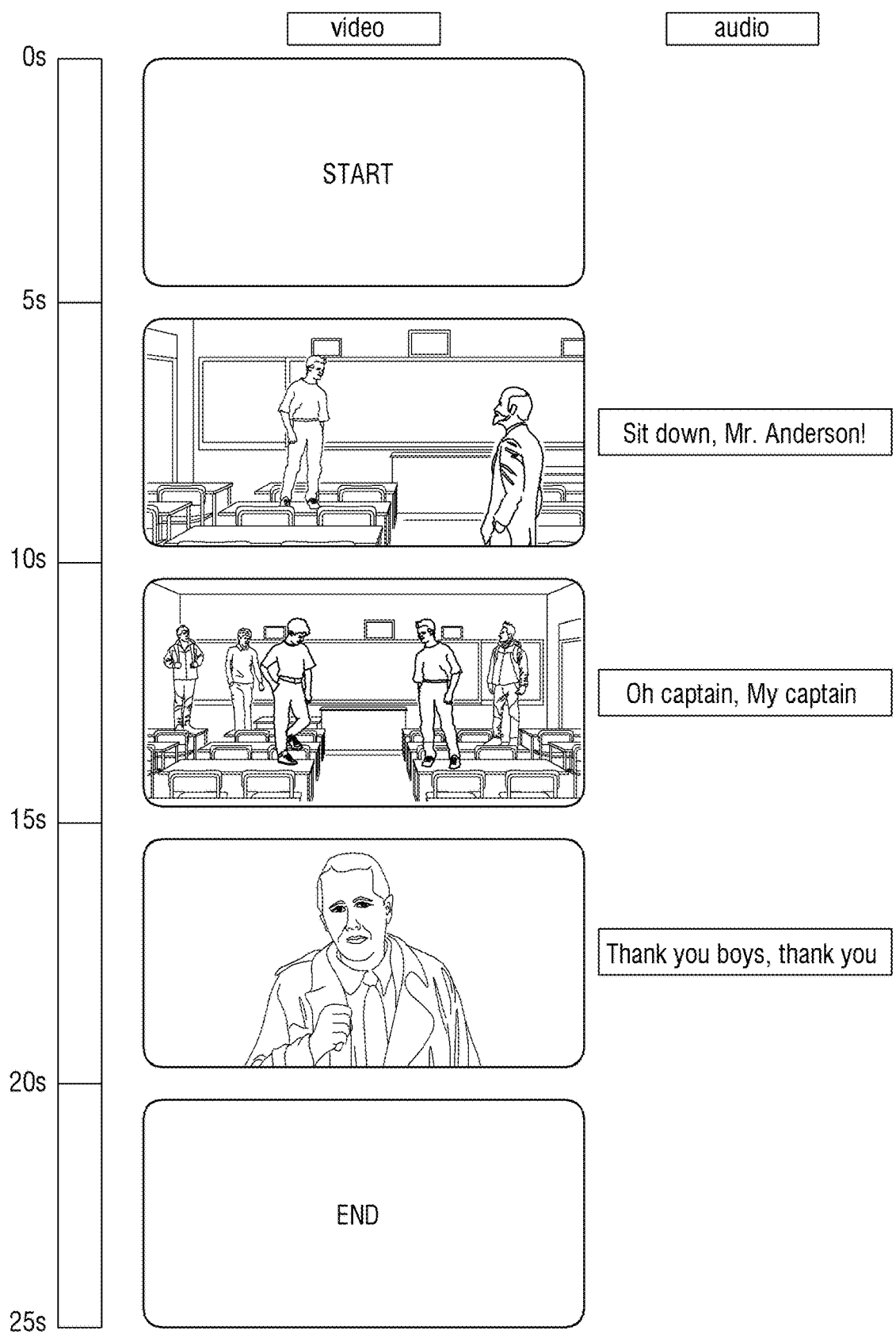
FIG. 6 is a diagram illustrating a video signal and an audio signal output from content.

FIG. 6 is a diagram illustrating a video signal and an audio signal output from content.

Referring to FIG. 6, the electronic device 100 may output a video signal through the display 110 and may output an audio signal using the speaker 105. The video signal may include a scene indicated with "start" between 0 and 5 seconds, a scene in which a male teacher in 80s yelling at a student standing on a desk between 5 second and 10 second, a scene where a plurality of students standing on a desk between 10 second and 15 second, a scene where a male of 40s speaking from 15 second to 20 second, and a scene where "END" is displayed between 20 second and 25 second. The audio signal may not include an audio signal including speech information between 0 and 5 seconds, may include "Sit down, Mr. Anderson!" between 5 second and 10 second, include "Oh captain, My captain" between 10 second and 15 second, may include "Thank you boys, thank you" between 15 second and 20 second, and may not include an audio signal including voice information between 20 second and 25 second.

Referring to FIG. 6, the electronic device 100 may output a synchronized video signal and audio signal according to time information.

Figure 7:
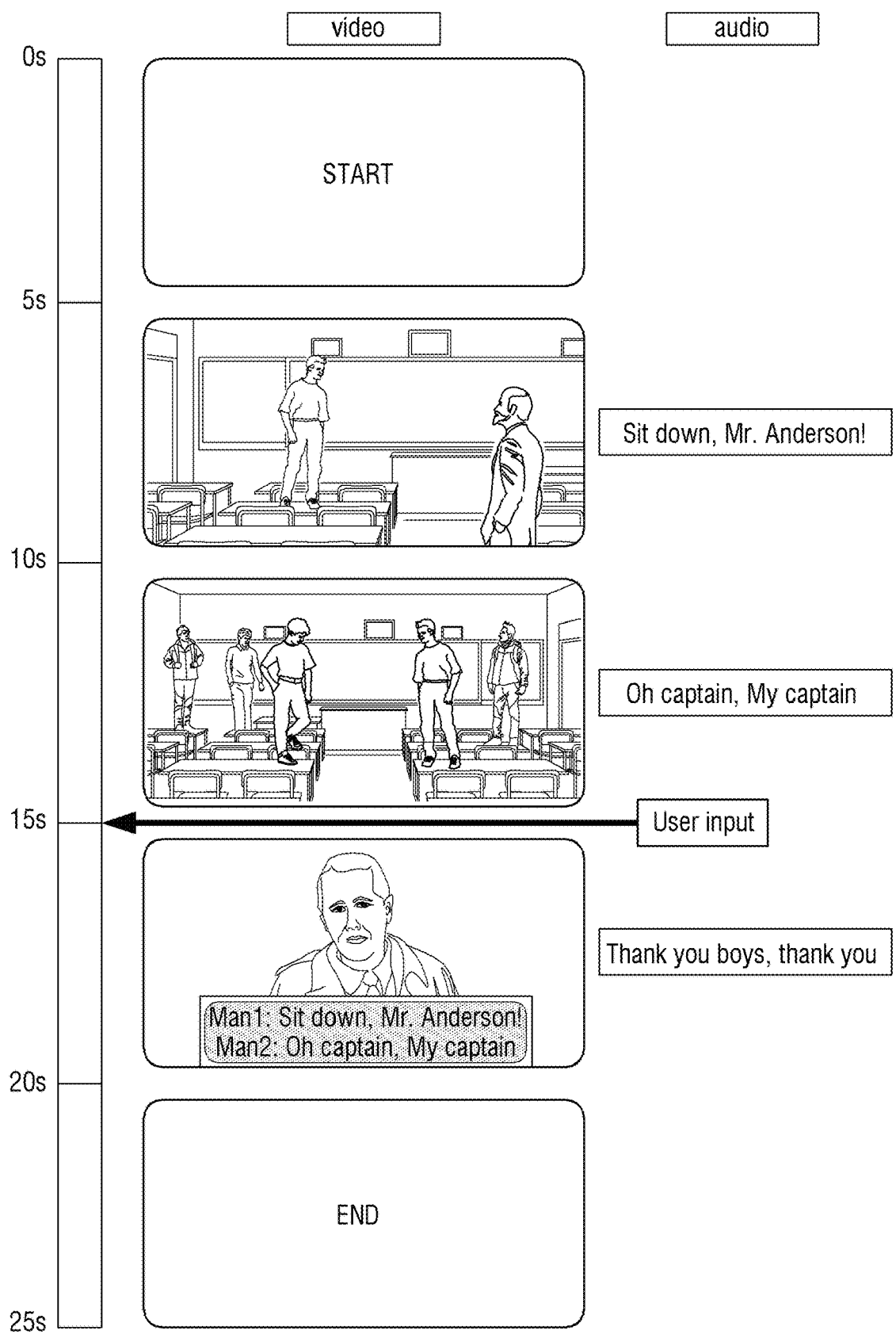
FIG. 7 is a diagram illustrating an operation of providing caption information when there is a user input during reproduction of content.

FIG. 7 is a diagram illustrating an operation of providing caption information when there is a user input during reproduction of content.

Referring to FIG. 7, the electronic device 100 may display caption information on the display 110 based on user input. The user input may be a control command to display caption information. For example, the user input may correspond to a voice control command representing a command to provide caption information. The user may utter a control command to provide caption information, and the electronic device 100 may identify whether the user utterance and pre-stored control command information match.

When the electronic device 100 determines that the user utterance and pre-stored control command information (caption information display command) are matched, the electronic device 100 may provide caption information corresponding to a preset previous time. For example, the preset previous time may be set to ten seconds and the user control command (user input) may be received at 15 seconds. The electronic device 100 may obtain an audio signal for 10 seconds based on 15 seconds, which is a current point of time. When a user input is received, the electronic device 100 may obtain an audio signal corresponding to a period between 5 seconds and 15 seconds of the content. The electronic device 100 may perform a voice recognition operation by using an audio signal received at a corresponding interval (pre-set previous time) between 5 seconds and 15 seconds. The electronic device 100 may perform a voice recognition operation to convert (obtain) an audio signal into text information. The electronic device 100 may display the caption information on the display 110 based on the converted text information.

Figure 8:
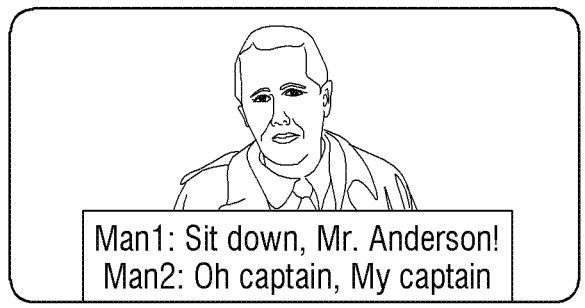
FIG. 8 is a diagram illustrating various embodiments of providing caption information.
Figure 8:
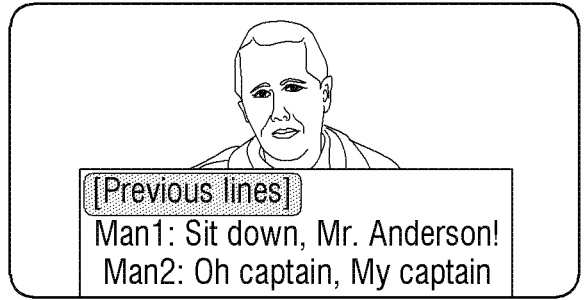
Figure 8:
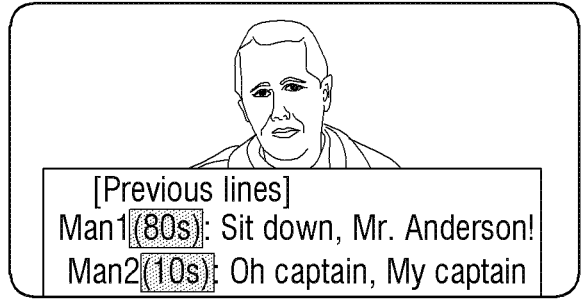

FIG. 8 is a diagram illustrating various embodiments of providing caption information.

The electronic device 100 according to an embodiment (first embodiment) may display an ordinal and a gender of a character and provide caption information.

The electronic device 100 according to another embodiment (second embodiment) may include information that previous dialog will be displayed in the caption information.

According to another embodiment (third embodiment), the electronic device 100 may include the age information of the character in the caption information. The electronic device 100 may analyze an audio signal corresponding to a specific interval to estimate the age of the speaker, and may include the estimated age information in the caption information. For example, the caption information may include information such as [male 1 in 80s: "Sit down, Mr. Anderson!" male 2 in 10s: "Oh captain, My captain"].

Figure 9:
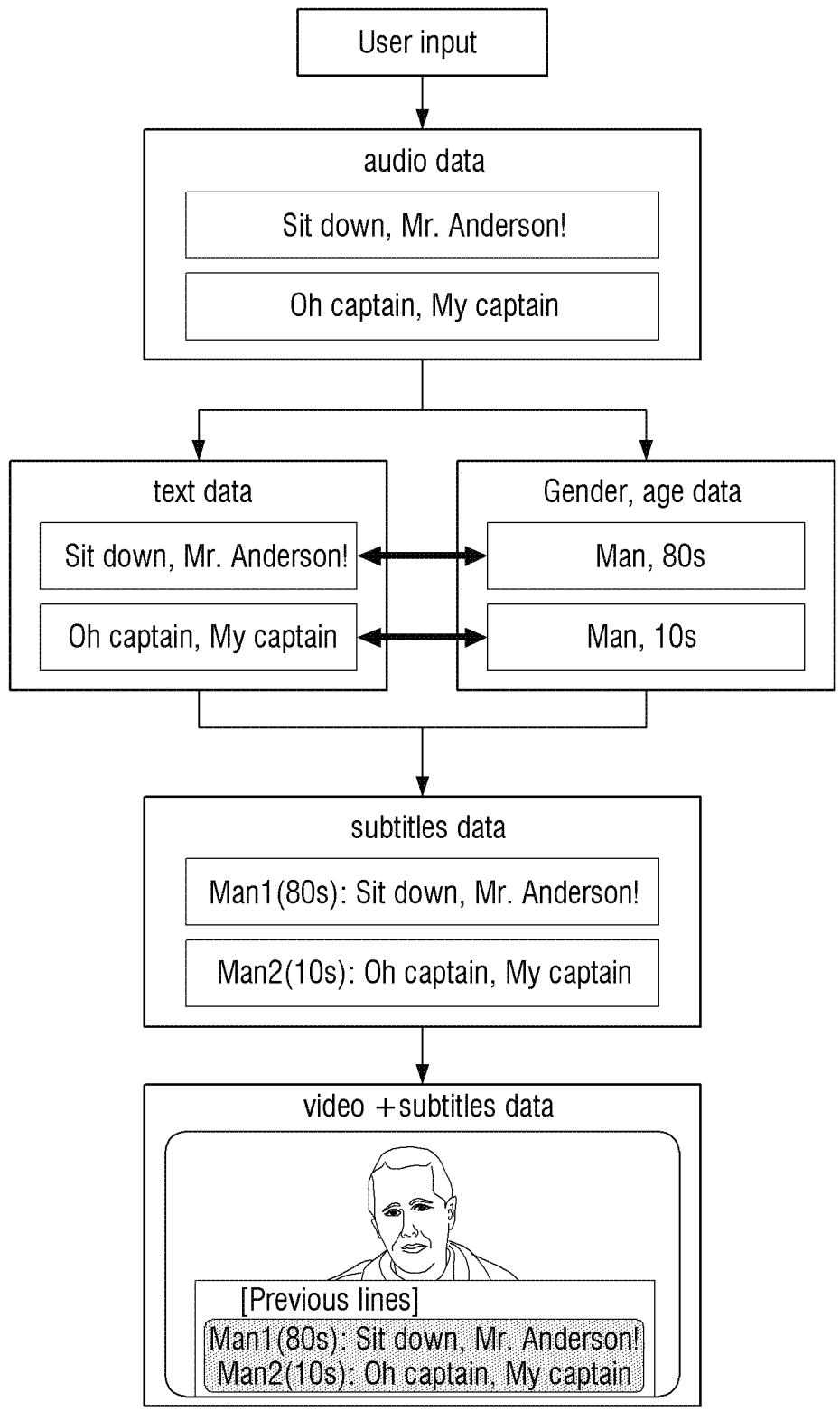
FIG. 9 is a diagram illustrating a process of generating caption information according to an embodiment.

FIG. 9 is a diagram illustrating a process of generating caption information according to an embodiment.

Referring to FIG. 9, the electronic device 100 may perform a voice recognition operation using the received audio signal (audio signal corresponding to a specific interval), and obtain at least one of text information, gender information, or age information as a result of speech recognition. The electronic device 100 may analyze the audio signal and may obtain information that the male in 80s uttered "Sit down, Mr. Anderson!" and information that the male in 10s uttered "Oh captain, My captain." The electronic device 100 may generate caption information using the obtained information. The electronic device 100 may display the generated caption information together with (at the same time) the video signal currently being reproduced.

Figure 10:
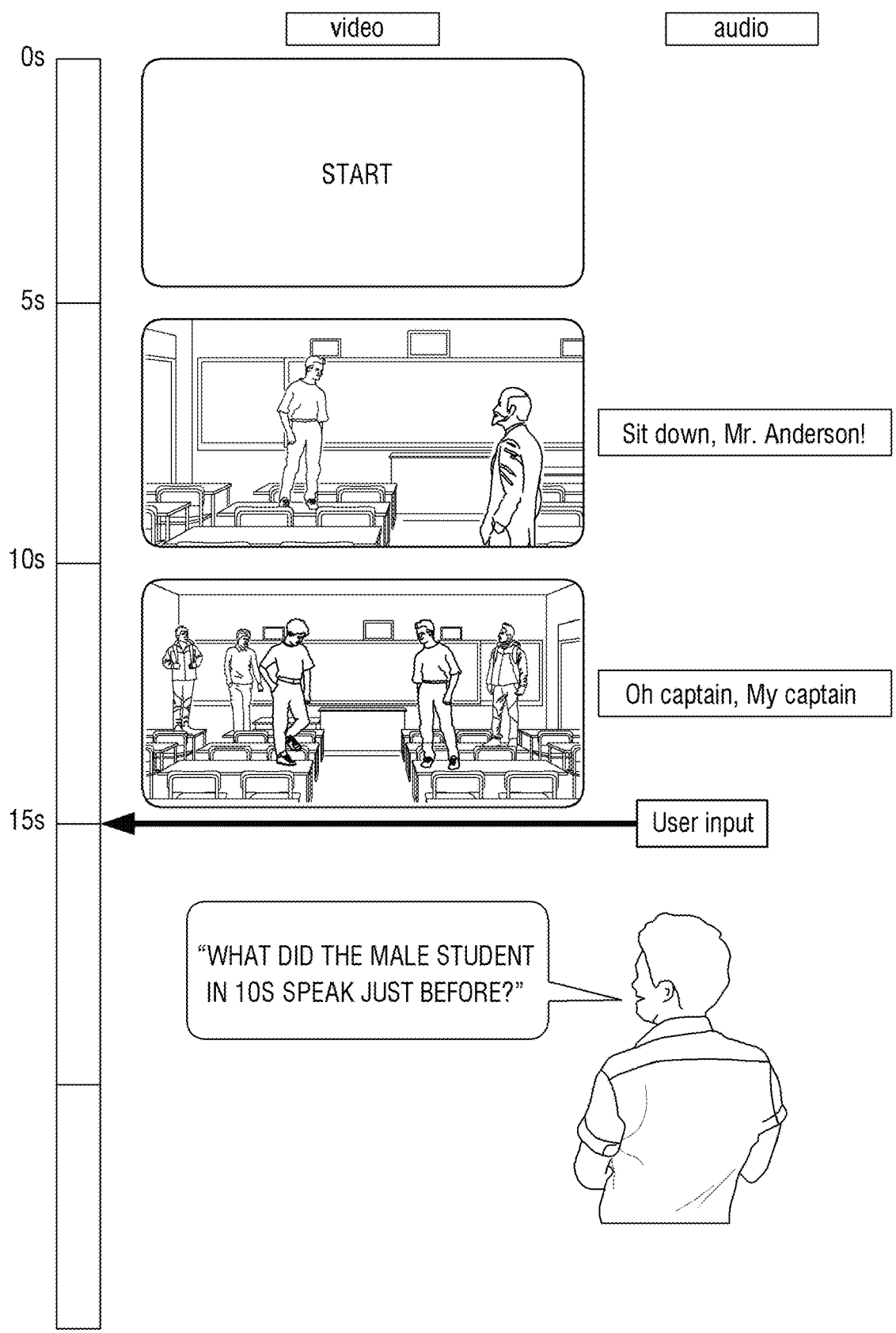
FIG. 10 is a diagram illustrating a user input according to an embodiment.

FIG. 10 is a diagram illustrating a user input according to an embodiment.

Referring to FIG. 10, the electronic device 100 may receive user input including additional information. For example, the electronic device 100 may receive the utterance "what did the male student in 10s speak just before?" The user's utterance (control command) may include additional information of "male student in 10s". In providing caption information, the electronic device 100 may use additional information "male student in 10s". The additional information may refer to the age information, the information for guessing age, the gender information, and information for guessing gender. According to another embodiment, additional information may mean various information that may specify a speaker.

Figure 11:
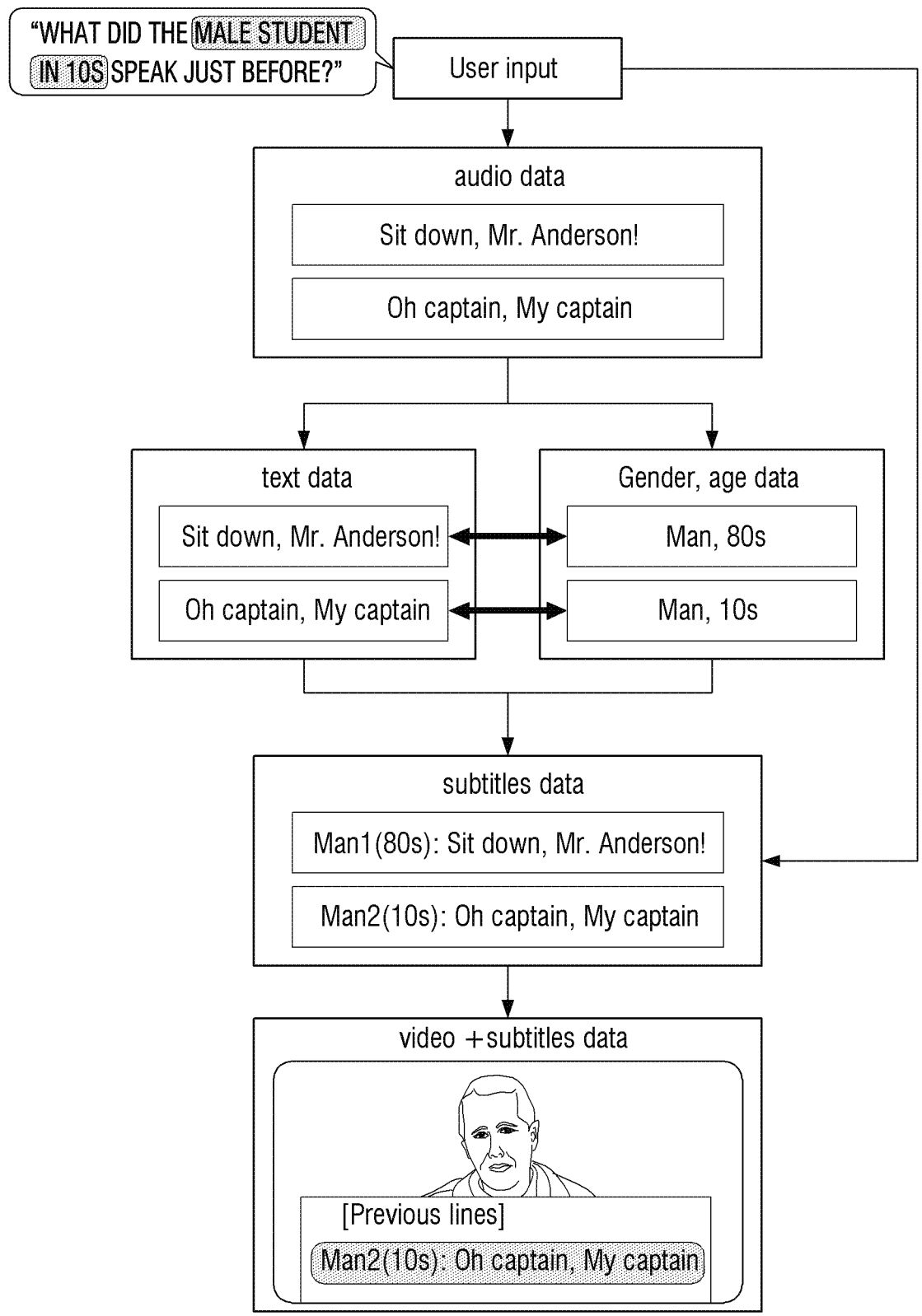
FIG. 11 is a diagram illustrating an operation of providing caption information according to a user input.

FIG. 11 is a diagram illustrating an operation of providing caption information according to a user input.

Referring to FIG. 11, the electronic device 100 may receive a user input including additional information and identify a voice recognition result corresponding to the additional information. The electronic device 100 may provide caption information using only a voice recognition result corresponding to the additional information. As described above with reference to FIG. 9, it is assumed that the electronic device 100 analyzes the audio signal to obtain information that the male in 80s uttered "Sit down, Mr. Anderson!" and the information that the man in 10s uttered "Oh captain, My captain." In this example, the electronic device 100 may use additional information "male student in 10s" to the user input. The electronic device 100 may identify a result corresponding to male in 10s of the voice recognition results. Alternatively, the electronic device 100 may identify a result corresponding to the student among the voice recognition results. The student may mean a particular age and may mean at least one of teenage or twenties. The age information corresponding to the student may refer to a specific age instead of teenage or twenties. For example, the age information corresponding to the student may refer to eight years to 19 years according to the user setting.

The electronic device 100 according to FIG. 11 may provide caption information using only a result corresponding to additional information included in a user input among a plurality of voice recognition results. Since the word "male in 10s" or "student" is included in the utterance of the user, the electronic device 100 may specify the speaker and may provide only the caption information corresponding to the specified speaker. If there were many conversations for a predetermined time, the electronic device 100 may need to provide a plurality of caption information. However, if additional information capable of specifying the speaker exists in the user input, only the caption information for the corresponding speaker may be provided, and only the desired caption information desired by the user may be provided. Since the user receives only the desired caption information, the service satisfaction for the electronic device 100 may be increased.

Figure 12:
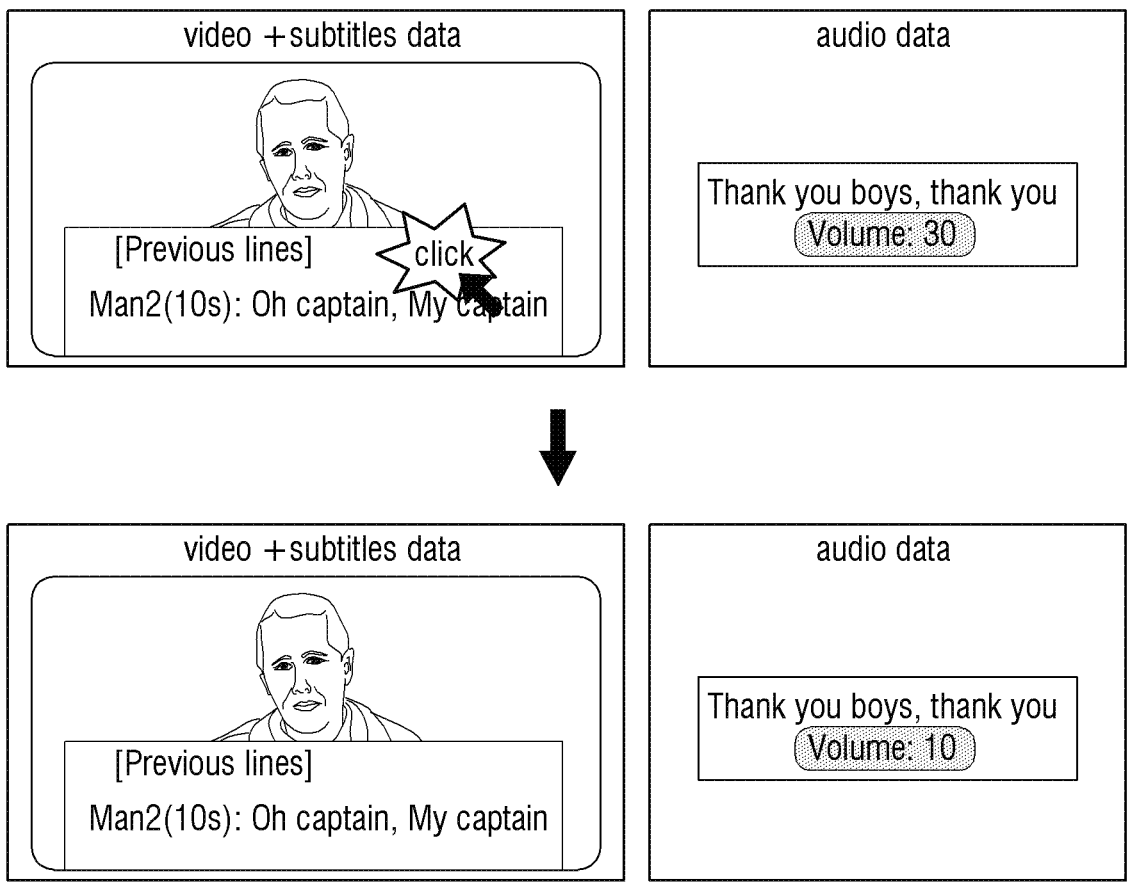
FIG. 12 is a diagram illustrating an operation of adjusting a size of audio output according to a user input.

FIG. 12 is a diagram illustrating an operation of adjusting a size of audio output according to a user input.

Referring to FIG. 12, the electronic device 100 may change the volume of an audio signal currently being provided according to a user's input. Specifically, it is assumed that the electronic device 100 provides a user interface (UI) including caption information. When a user clicks a UI including caption information, the electronic device 100 may change the volume of the currently output audio signal. For example, when the electronic device 100 receives a user input in which the UI providing caption may be clicked, the electronic device 100 may change the volume of "Oh captain, My captain" which is currently reproduced from 30 to 10. By reducing the volume of the currently output audio signal, the user may concentrate on the motion of watching the caption portion.

Figure 13:
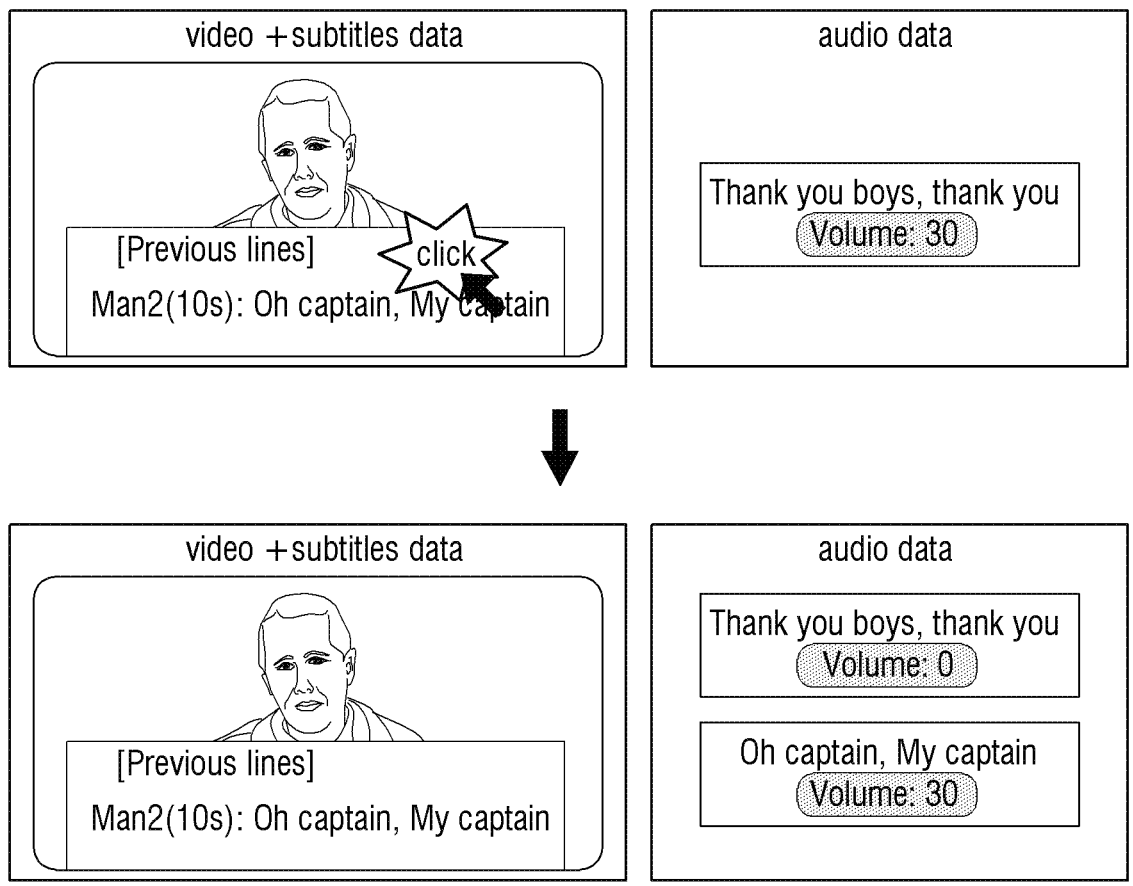
FIG. 13 is a diagram illustrating an operation of changing a target of audio output according to a user input.

FIG. 13 is a diagram illustrating an operation of changing a target of audio output according to a user input.

Referring to FIG. 13, the electronic device 100 may change the volume of the audio signal currently reproduced to 0 according to a user input. The electronic device 100 may output an audio signal corresponding to the caption information.

For example, as an embodiment illustrated in FIGS. 10 and 11, it is assumed that the caption information includes [a man in 10s, "Oh captain, My captain"] is included. When the electronic device 100 receives the user input, the electronic device 100 may output the video signal of the scene that the man in his 40s speaks, caption information of [man in 10s, "Oh captain, My captain"], and audio signal of "Thank you boys, thank you". When the electronic device 100 receives the user's preset input (selecting a UI including caption information), the electronic device 100 may change the audio signal volume of "Thank you boys, thank you" which is output in the past to 0, and may change the audio signal volume of the audio signal "Oh captain, My captain" corresponding to the caption information to 30. Instead of outputting an audio signal synchronized with a currently reproduced video signal, the electronic device 100 may output an audio signal corresponding to caption information. According to the audio signal corresponding to the caption information provided by the electronic device 100, the user may recognize the caption information through sense of hearing.

According to the embodiment of FIG. 13, a user may not hear an audio signal corresponding to a video signal currently being reproduced. Therefore, when it is determined that the user is more curious about the previous conversation (dialogue) instead of the currently reproduced screen, the operation of FIG. 13 may be used by the user.

Figure 14:
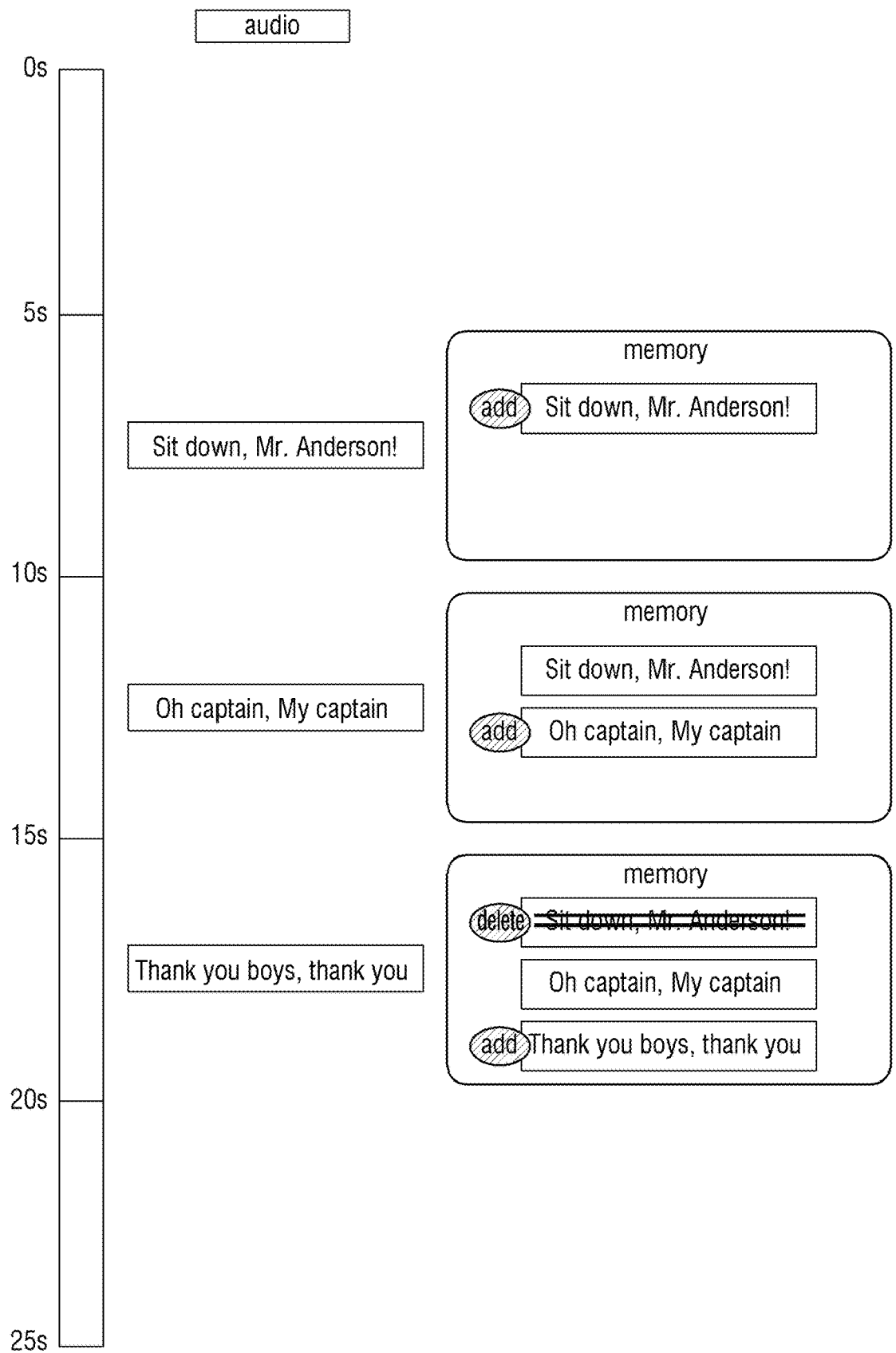
FIG. 14 is a diagram illustrating an operation of storing and deleting an audio signal according to an embodiment.

FIG. 14 is a diagram illustrating an operation of storing and deleting an audio signal according to an embodiment.

Referring to FIG. 14, the electronic device 100 may store an audio signal only for a predetermined time. In order to provide caption information, the electronic device 100 may separately store an audio signal to perform a voice recognition operation. However, a large capacity memory may be required to store all audio signals. The electronic device 100 may maintain the audio signal only for a predetermined time and delete the old audio signal when a predetermined time elapses.

For example, it is assumed that the electronic device 100 stores only the audio signal corresponding to 10 seconds in the memory. The electronic device 100 may store only the corresponding audio signal for 10 seconds from the current point of time in the memory and may delete the audio signal past 10 seconds from the current point of time.

Referring to FIG. 14, based on receiving "Sit down, Mr. Anderson!" which is the first audio signal, the electronic device 100 may store the audio signal corresponding to "Sit down, Mr. Anderson!" in the memory. The electronic device 100 may store the audio signal corresponding to "Oh captain, My captain" obtained in the interval of 10 second to 15 second in the memory. The electronic device 100 may additionally store the audio signal corresponding to "Thank you boys, thank you" received in the interval of 15 second to 20 seconds in the memory. The electronic device 100 may delete, from the memory, the part corresponding to "Sit down, Mr. Anderson!" which is the part that the preset time (10 seconds) has passed at the same time.

Due to the operation of the electronic device 100 disclosed in FIG. 14, the audio signal stored in the memory may be limited, and may be helpful for securing data capacity and improving processing speed. The memory illustrated in FIG. 14 may be a non-volatile memory or a volatile memory. When storing the audio signal in the volatile memory, there may be an advantage that the capacity of the stored audio signal may be large. When the audio signal is stored in the volatile memory, there may be an advantage that processing speed is fast.

Figure 15:
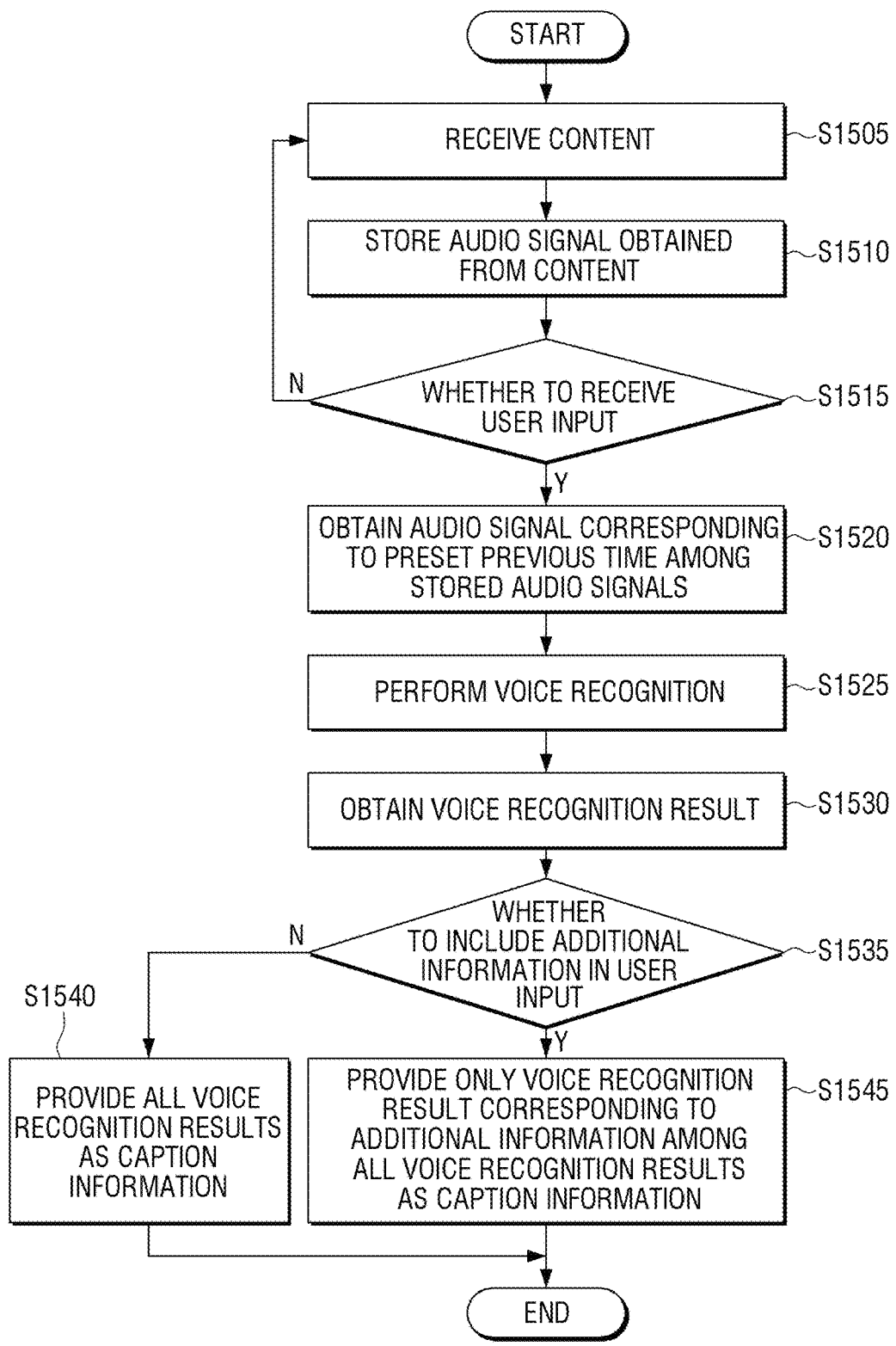
FIG. 15 is a flowchart to illustrate an operation of providing caption information according to additional information included in the user input according to an embodiment.

FIG. 15 is a flowchart to illustrate an operation of providing caption information according to additional information included in the user input according to an embodiment.

Referring to FIG. 15, the electronic device 100 may receive content including a video signal and an audio signal from an external device in operation S1505. The electronic device 100 may separately obtain only the audio signal from the received content and store the obtained audio signal in a memory in operation S1510.

The electronic device 100 may identify whether a user input has been received in operation S1515. If the electronic device 100 does not receive a user input, the electronic device 100 may continuously receive the content and store only the audio signal corresponding to a predetermined time in the memory. When the electronic device 100 receives a user input, the electronic device 100 may obtain an audio signal corresponding to a preset previous time of the stored audio signals in operation S1520. For example, it may be assumed that the audio signal is stored for 20 seconds from the current point of time. The electronic device 100 may obtain only an audio signal corresponding to 10 seconds of an audio signal of 20 seconds stored according to a user input. According to another embodiment, the electronic device 100 may obtain all of the audio signals corresponding to 20 seconds according to the user setting.

The electronic device 100 may transmit the obtained audio signal to the voice recognition module to perform a voice recognition operation in operation S1525. The electronic device 100 may obtain a voice recognition result by a voice recognition operation in operation S1530. The electronic device 100 may identify whether additional information is included in the user input in operation S1535. If the additional information is not included in the user input, the electronic device 100 may provide all of the voice recognition results to the caption information in operation S1540. If the additional information is included in the user input, the electronic device 100 may provide only the voice recognition result corresponding to the additional information among the voice recognition results as the caption information in operation S1545.

Figure 16:
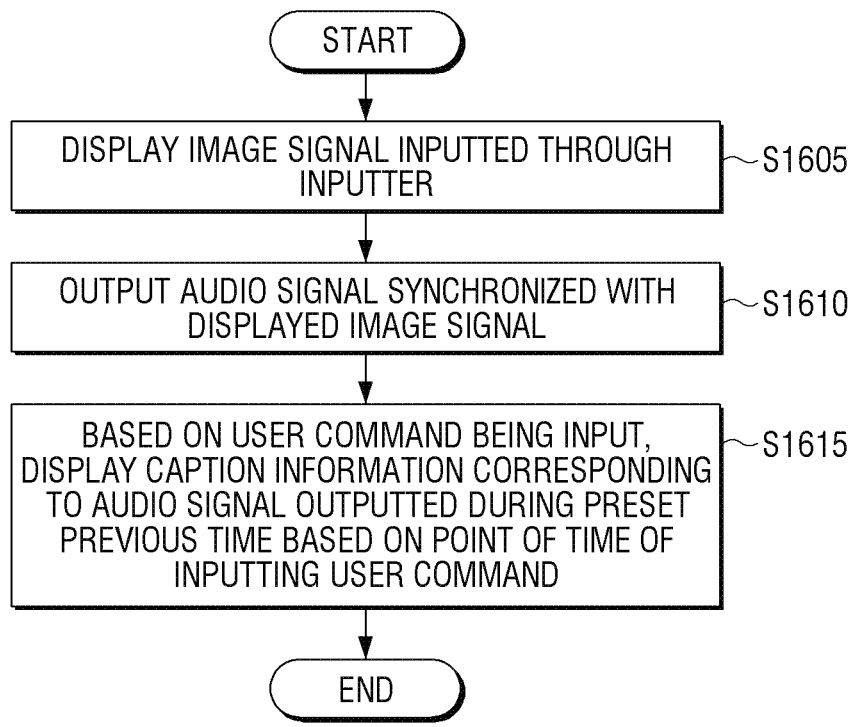
FIG. 16 is a flowchart illustrating a method for controlling an electronic device according to an embodiment.

FIG. 16 is a flowchart illustrating a method for controlling an electronic device according to an embodiment.

A method of controlling the electronic device 100 according to an embodiment may include displaying an image signal inputted through the inputter. The method of controlling the electronic device 100 may include outputting an audio signal synchronized with the displayed image signal. The method of controlling the electronic device 100 may include, based on a user command being input, displaying caption information corresponding to the audio signal outputted during a preset previous time based on a point of time of inputting the user command.

The displaying the caption information may include identifying a voice signal from an audio signal outputted during the preset previous time, obtaining a text corresponding to the voice signal, and displaying the caption information based on the obtained text.

The method of controlling the electronic device 100 may include identifying a voice signal corresponding to the additional information from the audio signal based on the additional information included in the user command.

The displaying the caption information may include, while the image signal inputted through the inputter 115 is displayed, displaying caption information corresponding to the audio signal outputted during the preset previous time.

The displaying the caption information may include displaying the image signal displayed during the preset previous time on a partial region of the display 110 along with the caption information.

The outputting an audio signal may include, based on the partial region of the display 110 being selected according to a user command, adjusting an output volume of an audio signal corresponding to the image signal inputted through the inputter 115.

The method of controlling the electronic device 100 may include, based on a partial region of the display 110 being selected according to a user command, controlling not to output the audio signal corresponding to the image signal inputted through the inputter 115 and controlling to output the audio signal corresponding to the image signal displayed on the partial region of the display 110.

The method of controlling the electronic device 100 may include storing the audio signal inputted through the inputter 115 in the memory, and deleting, from the memory, the audio signal inputted prior to the preset time with respect to a current point of time, among the stored audio signals.

The displaying the caption information may include, while the audio signal is outputted through the speaker 105, controlling the microphone to perform recording. The displaying may include storing a signal recorded through the microphone in the memory. The displaying may include obtaining a signal recorded during the preset previous time based on a point of time of inputting the user command, among the recorded signals stored in the memory, and displaying the caption information based on the obtained signal.

The control method of the electronic device as FIG. 16 may be executed on the electronic device having a configuration of FIG. 1 or FIG. 2, or may be executed on the electronic device having other configurations.

The methods according to the various embodiments as described above may be implemented as an application format installable in an existing electronic device.

The methods according to the various embodiments as described above may be implemented as software upgrade or hardware upgrade for an existing electronic device.

The various embodiments described above may be performed through an embedded server provided in an electronic device, or an external server of the electronic device.

The controlling method of the electronic device according to an embodiment may be implemented as a program and provided to the electronic device. In particular, a program including a controlling method of the electronic device may be stored in a non-transitory computer readable medium and provided.

A non-transitory computer readable medium storing computer instructions executed by the processor 120 of the electronic device 100 may control the electronic device 100 to perform operations including displaying an image signal inputted through the inputter 115. The outputting an audio signal synchronized with the displayed image signal and the displaying caption information corresponding to the audio signal outputted during a preset previous time based on a point of time of inputting the user command may be included.

The various embodiments described above may be implemented in a recordable medium which is readable by computer or a device similar to computer using software, hardware, or the combination of software and hardware. By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described herein may be implemented by the processor 120 itself. According to a software implementation, embodiments such as the procedures and functions described herein may be implemented with separate software modules. Each of the above-described software modules may perform one or more of the functions and operations described herein.

Meanwhile, the computer instructions for performing the processing operations in the electronic device according to the various embodiments described above may be stored in a non-transitory computer-readable medium. The computer instructions stored in this non-transitory computer-readable medium cause the above-described specific device to perform the processing operations in the electronic device according to the above-described various embodiments when executed by the processor of the specific device.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely exemplary and are not to be construed as limiting the disclosure. The present teaching may be readily applied to other types of devices. Also, the description of the embodiments of the disclosure is intended to be illustrative, and not to limit the scope of the claims, and many alternatives, modifications, and variations will be apparent to those skilled in the art.

What is claimed is:

1. An electronic device comprising:
a display;
a speaker;
an inputter; and
a processor configured to:
control the display to display an image signal inputted through the inputter, control the speaker to output an audio signal synchronized with the displayed image signal,
based on a user command being input, identify a voice signal from an audio signal outputted during a preset previous time based on a point of time of inputting the user command,
perform a voice recognition operation on the voice signal to obtain text information, gender information and age information,
based on the user command including additional information for identifying a character in the image signal, determine caption information corresponding to the additional information based on the obtained text information, wherein the additional information includes gender information and age information, and
control the display to display, on a partial region of the display, a User Interface (UI) including the caption information while the image signal inputted through the inputter is displayed and the audio signal synchronized with the displayed image signal is outputted through the speaker.

2. The electronic device of claim 1, wherein the user command includes the additional information, and
wherein the processor is further configured to, based on the additional information, identify a voice signal corresponding to the additional information from the audio signal outputted during the preset previous time.

3. The electronic device of claim 1, wherein the processor is further configured to control the display to display the UI including the caption information corresponding to the audio signal outputted during the preset previous time.

4. The electronic device of claim 3, wherein the processor is further configured to control the display to display an image signal displayed during the preset previous time along with the caption information.

5. The electronic device of claim 4, wherein the processor is further configured to, based on the partial region of the display being selected according to a user command, adjust an output volume of the audio signal synchronized with the displayed image signal.

6. The electronic device of claim 5, wherein the processor is further configured to, based on the partial region of the display being selected according to a user command, control the speaker to decrease the output volume of the audio signal synchronized with the displayed image signal and control the speaker to increase an output volume of the audio signal outputted during the preset previous time.

7. The electronic device of claim 1, further comprising:
a memory,
wherein the processor is further configured to store an audio signal inputted through the inputter in the memory, and delete, from the memory, an audio signal inputted prior to the preset previous time with respect to a current point of time, among audio signals stored in the memory.

8. The electronic device of claim 1, further comprising:
a microphone; and
a memory,
wherein the processor is further configured to:
while the audio signal synchronized with the displayed image signal is outputted through the speaker, control the microphone to perform recording,
store a signal recorded through the microphone in the memory, and
obtain a signal recorded during the preset previous time based on a point of time of inputting the user command, among recorded signals stored in the memory, and control the display to display the UI including the caption information based on the obtained signal.

9. The electronic device of claim 1, wherein the processor is further configured to, based on receiving a user voice command, identify whether the user voice command is the user command to display the UI including the caption information.

10. A method of controlling an electronic device, the method comprising:
displaying an image signal inputted through an inputter on a display of the electronic device;
outputting an audio signal synchronized with the displayed image signal;
based on a user command being input, identifying a voice signal from an audio signal outputted during a preset previous time based on a point of time of inputting the user command;
performing a voice recognition operation on the voice signal to obtain text information, gender information and age information;
based on the user command including additional information for identifying a character in the image signal, determining caption information corresponding to the additional information based on the obtained text information, wherein the additional information includes gender information and age information; and
displaying, on a partial region of the display, a User Interface (UI) including the caption information while the image signal inputted through the inputter is displayed and the audio signal synchronized with the displayed image signal is outputted through a speaker.

11. The method of claim 10, wherein the user command includes the additional information, and
wherein the method further comprises, based on the additional information, identifying a voice signal corresponding to the additional information from the audio signal outputted during the preset previous time.

12. The method of claim 10, wherein the displaying the UI including the caption information comprises displaying the UI including the caption information corresponding to the audio signal outputted during the preset previous time.

13. The method of claim 12, wherein the displaying the UI including the caption information comprises displaying an image signal displayed during the preset previous time along with the caption information.

* * * * *